United States Patent
Mesec

(10) Patent No.: US 8,041,520 B2
(45) Date of Patent: Oct. 18, 2011

(54) METHOD TO DETECT MECHANICAL FAULTS AND DYNAMIC INSTABILITY IN ROTOR SYSTEMS OF HELICOPTERS, TILT ROTOR AIRCRAFT, AND WHIRL TOWERS

(76) Inventor: Gilbert Ronald Mesec, Hague, VA (US)

( * ) Notice: Subject to any disclaimer, the term of this patent is extended or adjusted under 35 U.S.C. 154(b) by 335 days.

(21) Appl. No.: 12/284,100

(22) Filed: Sep. 18, 2008

(65) Prior Publication Data

US 2009/0088922 A1    Apr. 2, 2009

Related U.S. Application Data

(60) Provisional application No. 60/995,389, filed on Sep. 26, 2007.

(51) Int. Cl.
*G01R 31/00*    (2006.01)
*G01M 17/00*    (2006.01)

(52) U.S. Cl. .......................................... 702/58; 701/29

(58) Field of Classification Search .................. 702/58, 702/33–36, 40–44, 56–57, 59, 65–76, 79, 702/81, 84–85, 87, 89–91, 94–97, 101, 105–106, 702/108, 113–114, 123, 127, 141–142, 144–147, 702/150–151, 154, 159, 166, 168, 172, 175, 702/179–185, 189, 193, 198–199; 244/17.11, 244/17.13; 73/1.81, 1.84, 570, 579, 583, 73/649, 653–654, 658, 660–661; 356/4.01, 356/4.08, 6, 138, 139.04–139.05, 139.1, 356/150, 614–615, 620; 701/3, 8–10, 14, 701/29

See application file for complete search history.

(56) References Cited

U.S. PATENT DOCUMENTS

| | | | |
|---|---|---|---|
| 3,938,762 A | | 2/1976 | Murphy |
| 4,053,123 A | | 10/1977 | Chadwick |
| 4,604,526 A | * | 8/1986 | Moir .......................... 250/559.3 |
| 4,812,643 A | | 3/1989 | Talbot |
| RE33,097 E | | 10/1989 | Moir |
| 4,887,087 A | | 12/1989 | Clearwater |
| 4,937,758 A | * | 6/1990 | Hayden et al. ................ 700/280 |
| 5,249,470 A | | 10/1993 | Hadley |
| 5,929,431 A | | 7/1999 | Hadley |
| 6,415,206 B1 | | 7/2002 | Ventres |
| 6,448,924 B1 | | 9/2002 | Hafer |
| 6,574,572 B2 | | 6/2003 | Bechhoefer |
| 7,006,947 B2 | | 2/2006 | Tyron, III |

OTHER PUBLICATIONS

Field Manual FM 1-514, Fundamental of Rotor and Power Train Maintenance—Techniques and Procedures, Apr. 5, 1991, Department of the Army, 68 pp.*

N A Sargent, An Analysis of Detector Data Collected During the MFR Flight Trials, Doc. Ref. HT/0060/DDAI, Apr. 23, 1993, 15 pages, Helitune Limited.

* cited by examiner

Primary Examiner — Michael Nghiem
Assistant Examiner — Toan Le

(57) ABSTRACT

A method of processing revolution to revolution blade track height and timing data so that mechanical and dynamic stability, maladjustments, and defects are discovered in a rotor with a plurality of blades on a vertical lift aircraft. Tracking devices collect blade track height and timing data. That data are processed into track and lead-lag data sets. Data set values are sorted maximum to minimum, or in reverse order, to remove the chaotic character of the collected data, thereby adding coherence and linearity to it. Defects and maladjustments are found by analyzing processed aircraft flight condition data combined in various ways. Only ground and hover flight condition analysis is required. Data collection and analysis is very rapid and the analysis output is presented graphically. The analyzed data are available moments after collection. Significant operational, safety, and cost saving are achieved.

8 Claims, 8 Drawing Sheets

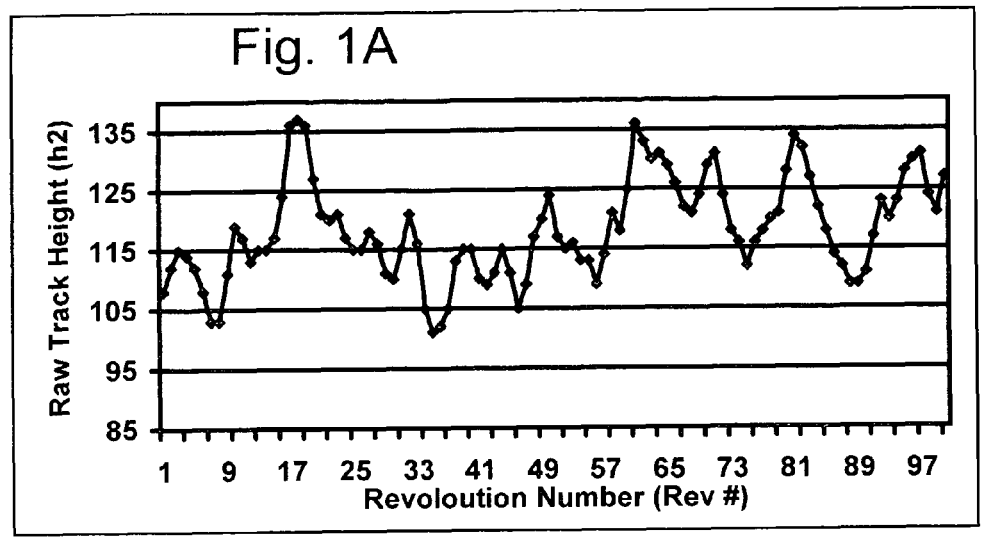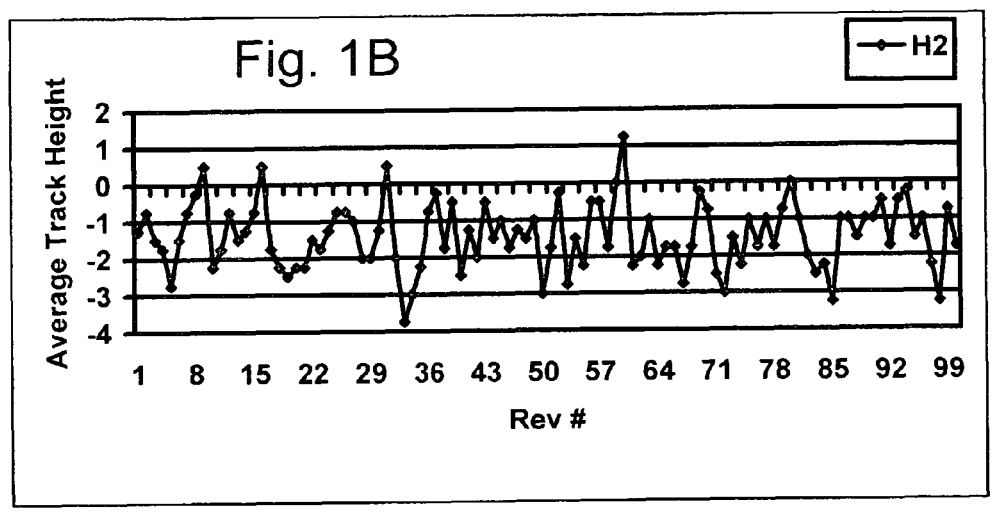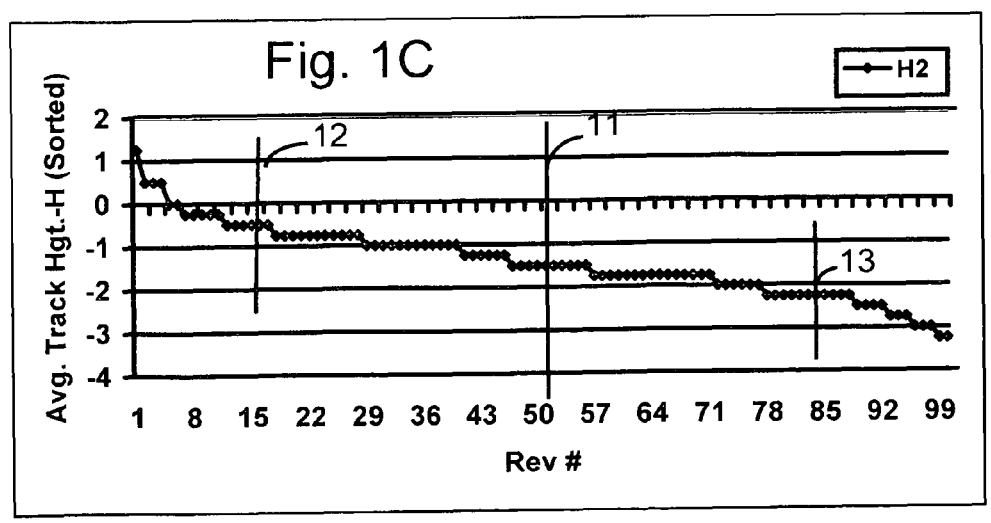

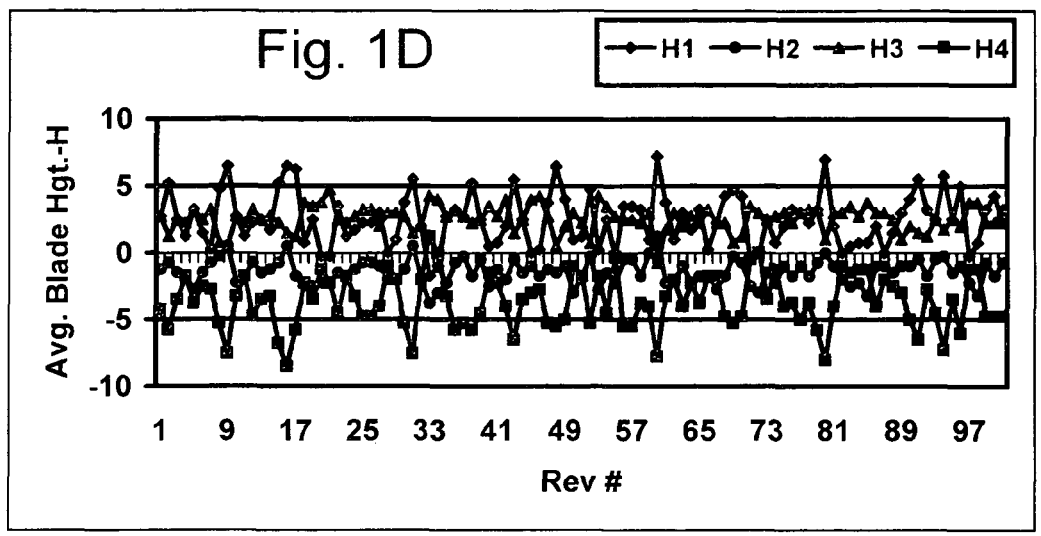
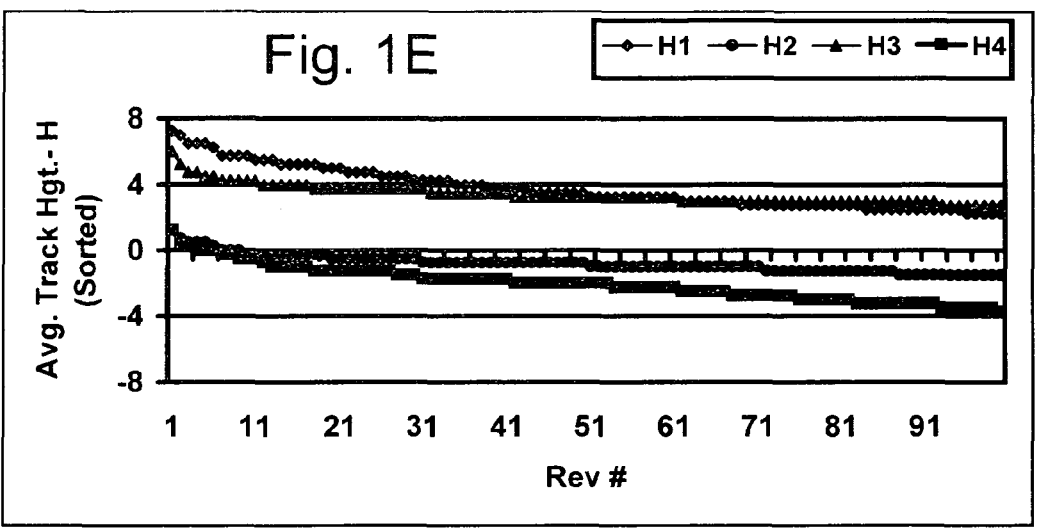
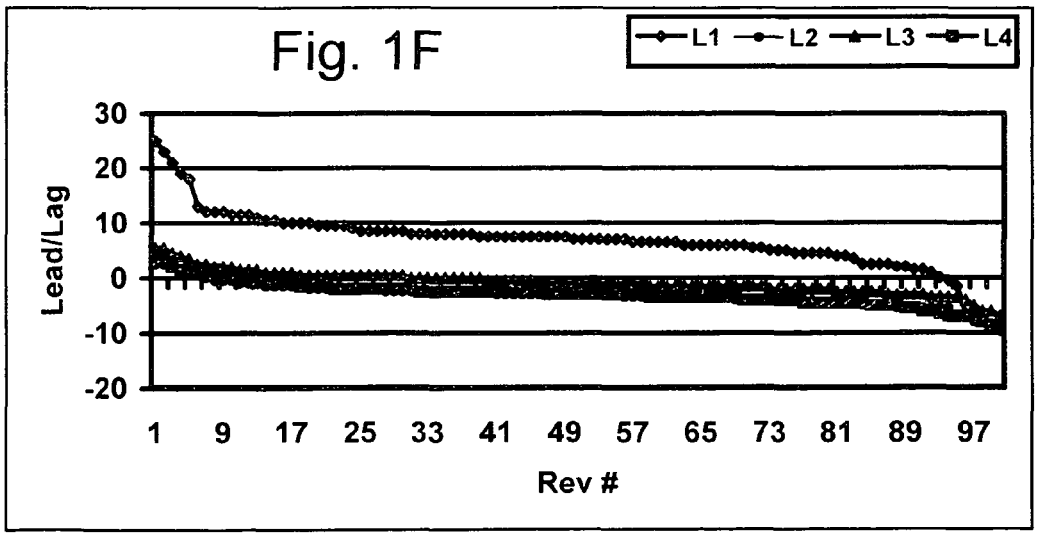

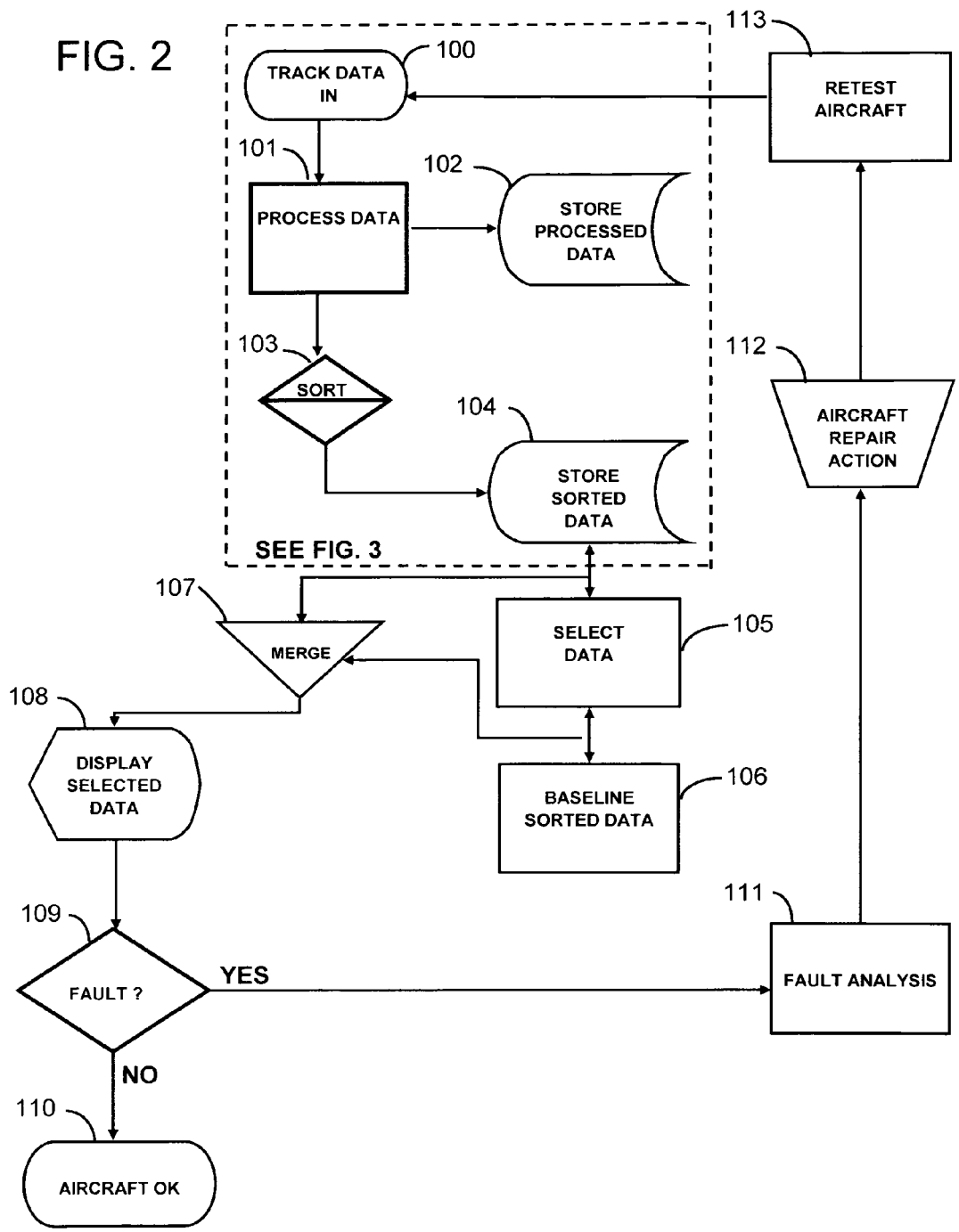

Fig. 6

| Baseline Tracker Data | | | Increased Track Resolution | | | Individual Blade Sort | | |
|---|---|---|---|---|---|---|---|---|
| h1 | h2 | h3 | H1 | H2 | H3 | H1 Sort | H2 Sort | H3 Sort |
| 93 | 90 | 91 | 1.67 | -1.33 | -0.33 | 2.33 | 1.67 | 1.33 |
| 86 | 84 | 85 | 1.00 | -1.00 | 0.00 | 1.67 | 1.00 | 0.33 |
| 83 | 83 | 85 | -0.67 | -0.67 | 1.33 | 1.67 | 1.00 | 0.33 |
| 86 | 85 | 86 | 0.33 | -0.67 | 0.33 | 1.33 | 0.67 | 0.33 |
| 84 | 83 | 84 | 0.33 | -0.67 | 0.33 | 1.00 | 0.67 | 0.00 |
| 92 | 90 | 90 | 1.33 | -0.67 | -0.67 | 1.00 | 0.67 | 0.00 |
| 94 | 93 | 92 | 1.00 | 0.00 | -1.00 | 1.00 | 0.33 | -0.33 |
| 96 | 95 | 94 | 1.00 | 0.00 | -1.00 | 1.00 | 0.33 | -0.33 |
| 94 | 95 | 95 | -0.67 | 0.33 | 0.33 | 0.67 | 0.33 | -0.67 |
| 88 | 88 | 87 | 0.33 | 0.33 | -0.67 | 0.67 | 0.00 | -0.67 |
| 89 | 87 | 84 | 2.33 | 0.33 | -2.67 | 0.33 | 0.00 | -1.00 |
| 90 | 90 | 88 | 0.67 | 0.67 | -1.33 | 0.33 | -0.67 | -1.00 |
| 86 | 86 | 84 | 0.67 | 0.67 | -1.33 | 0.33 | -0.67 | -1.33 |
| 86 | 85 | 82 | 1.67 | 0.67 | -2.33 | -0.67 | -0.67 | -1.33 |
| 83 | 85 | 84 | -1.00 | 1.00 | 0.00 | -0.67 | -0.67 | -2.00 |
| 87 | 87 | 84 | 1.00 | 1.00 | -2.00 | -1.00 | -1.00 | -2.33 |
| 94 | 97 | 95 | -1.33 | 1.67 | -0.33 | -1.33 | -1.33 | -2.67 |

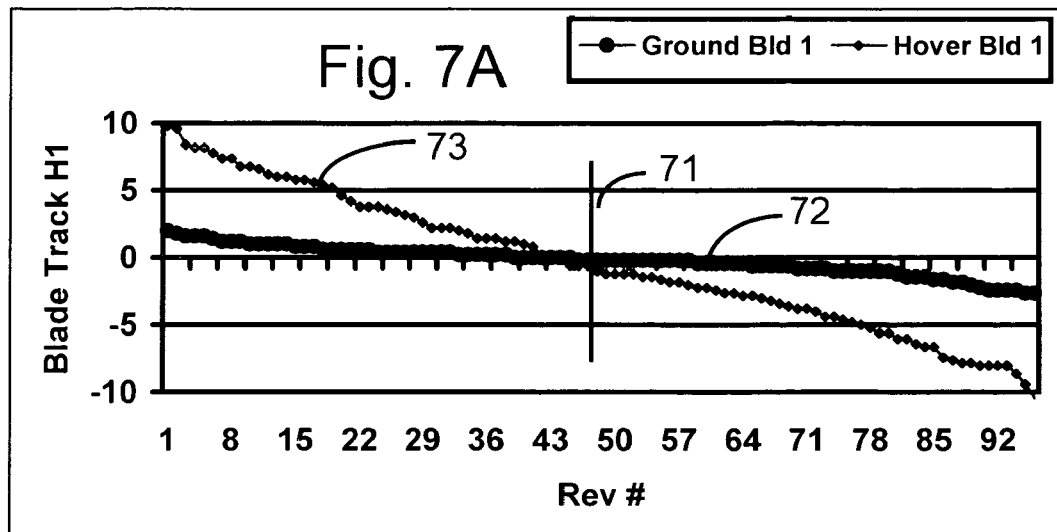
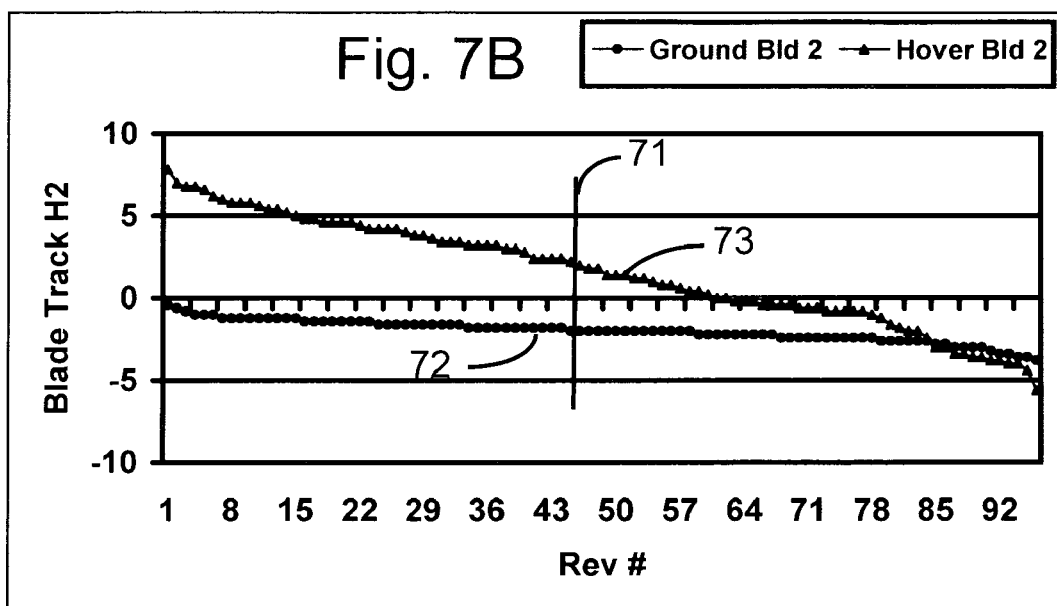

METHOD TO DETECT MECHANICAL FAULTS AND DYNAMIC INSTABILITY IN ROTOR SYSTEMS OF HELICOPTERS, TILT ROTOR AIRCRAFT, AND WHIRL TOWERS

CROSS REFERENCE TO RELATED APPLICATIONS

This application claims the benefit of provisional patent application Ser. No. 60/995,389 filed 2007 Sep. 26 by the present inventor.

FEDERALLY SPONSORED RESEARCH

Not Applicable

SEQUENCE LISTING

Not Applicable

BACKGROUND

1. Field of the Invention

This invention relates to vertical lift aircraft rotor system maintenance, specifically to the identification of rotor faults and dynamic instability in said systems using optical rotor blade tracking data.

2. Prior Art

Vertical lift aircraft rotor systems, rotor head and attached blades, deliver significant vibration into the aircraft. Asymmetric rotor weight, variations in lift and drag among the plurality of rotor blades, chord wise imbalance, general system ware and tear, mechanical faults, and other factors all contribute to induce vibration. The same factors that induce vibration can also threaten the safety of aircraft and crew. Over the years a variety of inventions have received patents with the primary focus of reducing the vibrations. A number of these focus on two primary sensing devices. These devices are accelerometer vibration sensors and optical or electronic blade tracking devices. The devices have been used alone and in combination by various organizations to reduce vibration in vertical lift aircraft. Optical trackers are typically used to view the aircraft rotor blades in flight and reduce the variations each in track. Track being the flight path that each blade takes in its rotation. Variations in track are indicators of variations in lift and can be major contributors to vibration. Accelerometers are typically attached to aircraft structure and sense vibration at the point of attachment. Accelerometer locations are selected for the sensitivity to vibration frequencies of interest, generally the primary rotor rotation frequency and its harmonics. The vibration levels at the locations selected are sense the levels of rotor induced vibration. When the sensed vibration is above established limits the rotor head and or attached blades are adjusted to lower vibration to acceptable levels. Supplementary sensors are included to detect rotor rotational speed. Signal processors or computers are used to analyze the complex signals collected by the various sensing devices and provide system adjustment recommendations.

Accelerometer only devices such as U.S. Pat. No. 3,938, 762, U.S. Pat. No. 4,937,758, U.S. Pat. No. 6,415,206 and U.S. Pat. No. 6,574,572 rely on a plurality of accelerometers distributed about the aircraft. Data received from said accelerometers are processed using a computer algorithm. The result of said algorithm is to be an optimized set of adjustment of the rotor and its plurality of blades. The intended result is to reduce aircraft vibration. Accelerometers easily detect the aircraft's primary rotational frequency and several harmonics of that frequency. However, using accelerometers to detect rotor or blade component faults and dynamic instabilities is difficult if not impossible. Rotor induced vibrations enter the aircraft through two primary paths. Path one is through direct connection to the aircraft structure. Path two is air loads flowing from the turning rotors. Path two is pressure waves and turbulence impinging on the aircraft structure. The loss of detailed mechanical vibratory data in path two driven vibrations is obvious. In path one, the vibration must pass from the rotor head then through several mechanical interfaces such as gear boxes, engine interfaces, a variety of damping systems, and structural connections before reaching the accelerometers. Significant fault information never reaches accelerometers due to high information path interference and noise.

Optical and electronic tracking devices such as those taught in U.S. Pat. No. RE33,097 (original U.S. Pat. No. 4,604,526); U.S. Pat. No. 4,887,087; U.S. Pat. No. 5,929,431; U.S. Pat. No. 5,249,470; U.S. Pat. No. 6,448,942 and commercial derivatives of these patents are non destructive testing devices. These devices will be generically referred to as the "Tracker" here after. These devices mark the passing of a rotor blade though the viewing port or sensor detector and record the vertical position in the devices field of view, the time passage of each of a plurality of blades for each revolution of the rotor, and the total time required for the rotor to make the current revolution. Computational units are included within said devices and/or external to said devices. The computational units typically average several revolutions of rotor data, revolution to revolution data, to calculate track and lead/lag parameters. This averaging is used to smooth the variations in height and time occasioned by the blade over the several revolutions of the rotor. The revolution to revolution data collected are normally discarded once they have been included into the averaging calculations. Discarding the revolution to revolution data is encouraged in order to minimize the need for large amounts of data storage. More to the point, the use of the data revolution to revolution data was thought be of little or no value.

Optical blade trackers were used prior to the 1980s. The early systems depended primarily upon operators to visually determine the track of the rotor blades, in effect "averaging by eye". Optical blade trackers aided and controlled by computers to collect, analyze, and store data came into general use in the early 1980s. Today these devices are used extensively in helicopters, tilt rotor aircraft, and whirl towers. Whirl towers are helicopter rotor blade dynamic balancing facilities. Whirl towers are used to control the dynamic performance of rotor blades so that said blades can be interchanged within any of a set of blades of the same kind. Reconditioned and repaired rotor blades will also be dynamically tested at said towers to ensure that the blades meet the manufacturer's very tight weight and dynamic tolerances.

Through the years, mechanical and dynamic problems within rotor systems and associated blades have been encountered on rotor tower installations as well on various types of aircraft. The problems manifested themselves as anomalies within rotor tracking data collected from the aircraft or whirl tower. Although accelerometers were in use when many of the problems rotor system oriented problems were encountered, the accelerometer data did not materially aide in the diagnosis of these problems. Faults were often revealed in the affected aircraft or towers after physical investigations were made. The idea that optical tracking devices could be used to detect rotor head and blade faults has been considered by various organizations for years. Attempts by several companies to utilize optical tracking devices to analyze rotor faults have failed. A testament to this is the fact few, if any, commercial systems have a method of recoding and maintaining revolution to revolution data within their normal systems without evoking a specialty program used for engineering purposes. The engineering purposes noted here are generally to be a quality check of the tracking device.

This invention is one result from a body of work undertaken to improve rotor blade whirl tower, helicopter, and tilt rotor tracking techniques. Within the work effort it was decided to include the ability to collect and store revolution to revolution blade track data as a normal operator selectable function. The decision was based on the knowledge that the signs of failure and fault were resident in the data. The ability to extract fault data from said data would elevate the rotor tracking from a single to a multi-dimensional tracking device. Said ability would make the Tracker a viable maintenance tool for rapidly assessing the mechanical health of rotors and its associated blades. The question to be answered was how to extract the valuable information from the revolution to revolution data generated by the Tracker.

Rotor systems, including the plurality of attached blades, are designed to act as a unit for primary purpose of managing lift in a manner as to allow an aircraft to fly and be controlled directionally. The aerodynamic characteristics; airfoil cross sections, chord, blade twist, materials, weight distribution, etc.; of the rotor blades are fixed and very tightly controlled and held to tight tolerances throughout the manufacturing process. None-the-less, small variations will be found within the individual blades. Trim tabs, methods of adding or moving weight, and other techniques for modifying blades provided for the purpose of changing the lift and drag of an individual blade. Rotor heads are built with precision but some small variations are inherent in manufacturing.

Marrying a rotor head and a plurality of blades together on a specific model of vertical lift aircraft require that the flight patterns and dynamic responses of each blade on a rotor will be within very small tolerances from rotor blade to rotor blade, hub to hub, and from aircraft to aircraft. Normal wear and tear and occasional damage to blades and rotor demand adjustments of the blade's lift and drag qualities. Said adjustments may include altering pitch change link and/or trim tab settings, and adding or subtracting weight from the blade or rotor hub. Wear and tear to the blade, including field maintenance practices, can change a blade's weight distribution. These weight changes can radically change the flight qualities of a rotor blade by modifying the blades centrifugal pitching moment profile. Uncontrolled centrifugal moment changes may cause a blade to climb or dive excessively. The climbing and diving tendency can increase rapidly with addition of aircraft weight or flight loads and become so severe that loss of control of the aircraft can occur. Excessive wear and other faults can go unnoticed especially when tempo of operations are high, such as in military operations, search and rescue, fire fighting, logging, and other high energy situations where there is a demand for high vehicle availability. The need to rapidly access the rotor system and blade integrity in high tempo of operation situations is clear. The ability to detect faults is an equally powerful incentive when safety and efficiency of vertical lift operations are considered.

Significant analysis of revolution to revolution data from various aircraft and helicopter blade rotor tower installations were conducted. It was clear that a variety of unquantifiable aircraft and blade disturbing events such as pilot or automated control inputs, weather and air mass disturbances, load variations, and more were resident in the revolution to revolution data. These facts had been seen to lead others abandon using revolution to revolution data as a fault detection and maintenance tool. Our research took us to utilize statistical analysis and found that it was without promise. Something more unorthodox was required to use the subject data productively. Additional research and analysis led to a methodology of deconstruction of track, lead/lag, and rotor timing data. Said data are then recombined in way that provides the ability to recognize rotor related problems, rapidly access the dynamic health of a helicopter rotor system, and reduce track and balance evolutions to a small fraction of time generally required.

SUMMARY

The objective of the invention is to rapidly determine the mechanical soundness and dynamic stability of bladed rotors on vertical lift aircraft, and whirl towers. Trackers, well know in the art and the subject of several patents, are commercially available through several sources, and are used regularly to collect tracking data said aircraft and towers. A Tracker is used to collect revolution to revolution blade track, blade timing, and total time required for each revolution of the rotor from an aircraft. In one example of the embodiment, data are taken at one or a plurality of steady state test conditions, such as 50 foot hover, flat pitch ground run. Data are collected by a Tracker for a plurality of blades on the rotor system. Each data set consists of a plurality of revolutions of the rotor. The data are passed to a computational device for processing. Said data are first processes to increase the resolution of the track and timing data and remove induced Tracker motion. Next individual blade data set for each flight condition are sorted in a manner to remove the chaotic character of the data. Said sorting also causes the data to approach a linear distribution over a large percentage of the each individual blade's data set. This process is repeated for each flight condition flown. The data are displayed in a plurality of forms to provide indications that the rotor and/or attached blades, including rotor blade attachments are, or are not, mechanically and dynamically stable, free from unacceptable mechanical wear, or maladjusted. The data may be processed independently or combined in a plurality of ways to determine various failures, malfunctions, maladjustments, or unstable conditions using the processing methods or extensions of the methods outlined herein.

DRAWINGS

FIG. 1A is a graphic plot of 100 revolutions of raw track data for one rotor blade FIG. 1B shows the blade in FIG. 1A after the data are processed FIG. 1C is the sort of data in FIG. 1B.

FIG. 1D is a graphic plot of a set of a plurality of blades on the same rotor

FIG. 1E shows the effect of each blade data sets being processed

FIG. 1F A Rotor fault discovered

FIG. 2 is a flow chart describing one method of using Tracker data to discover and detect faults and dynamic instability in rotor systems.

Figure 3:
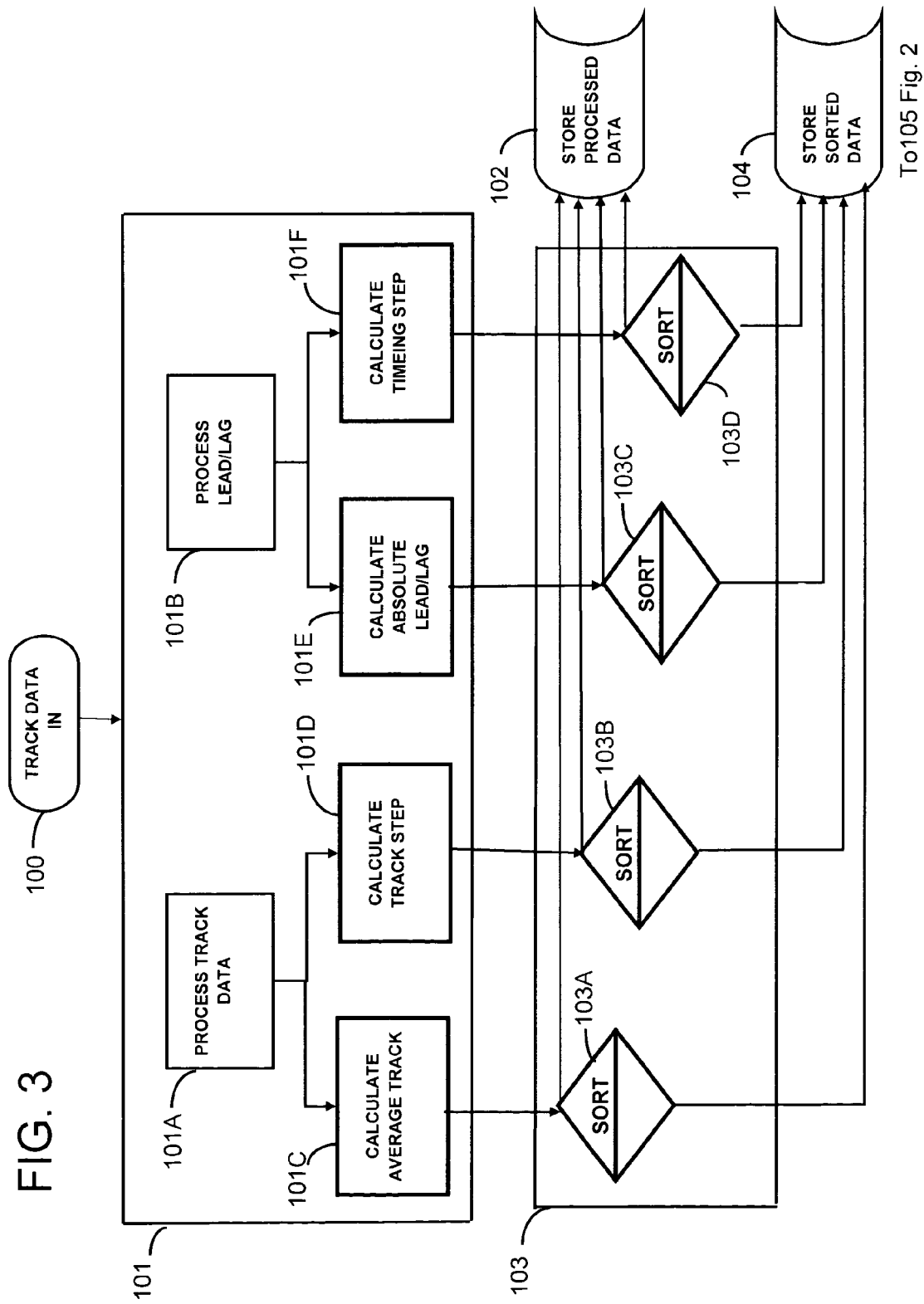

FIG. 3 is a flow chart describing one method of processing Tracker data

Figure 4:
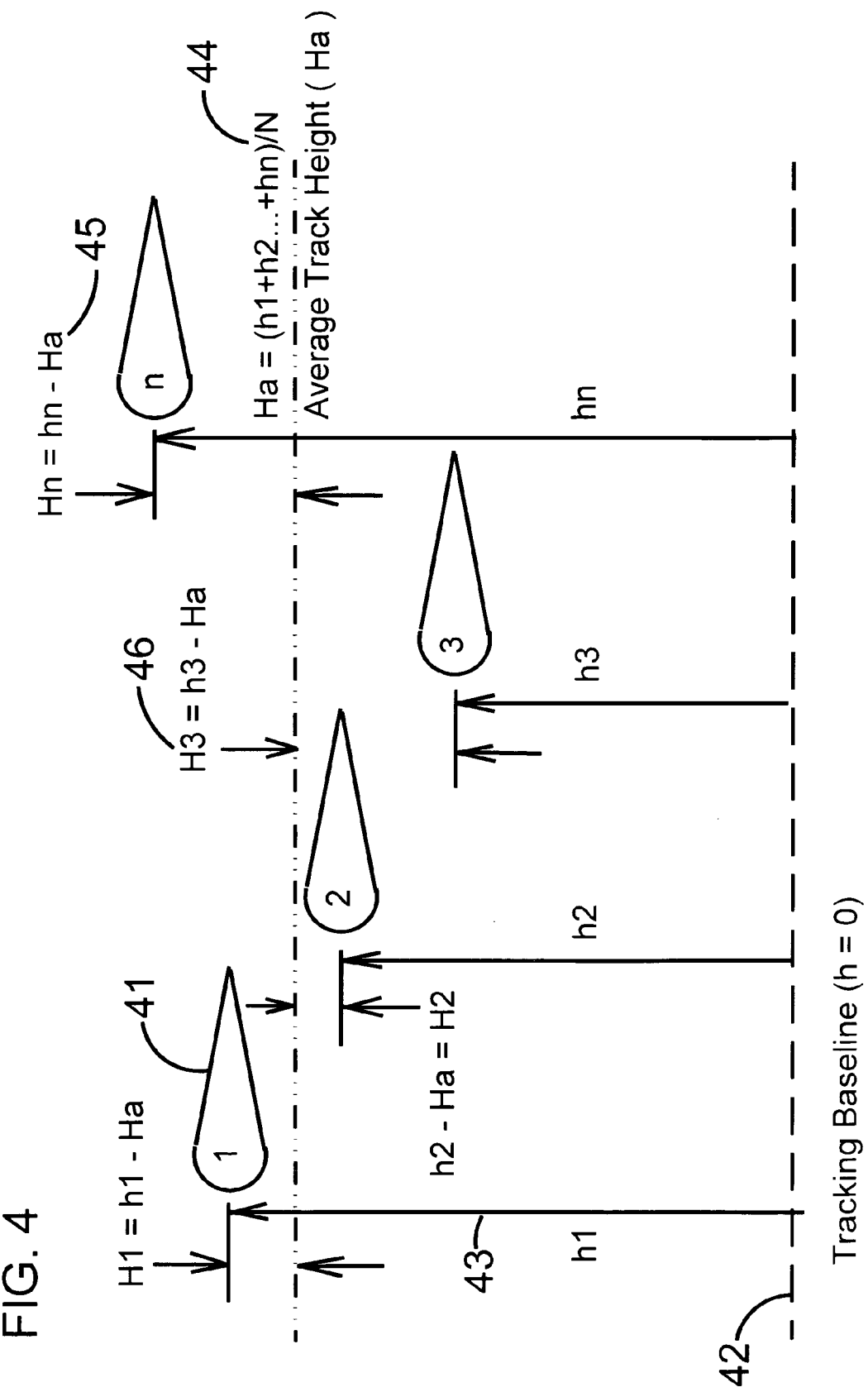

FIG. 4 describes one method of calculating average track.

Figure 5:
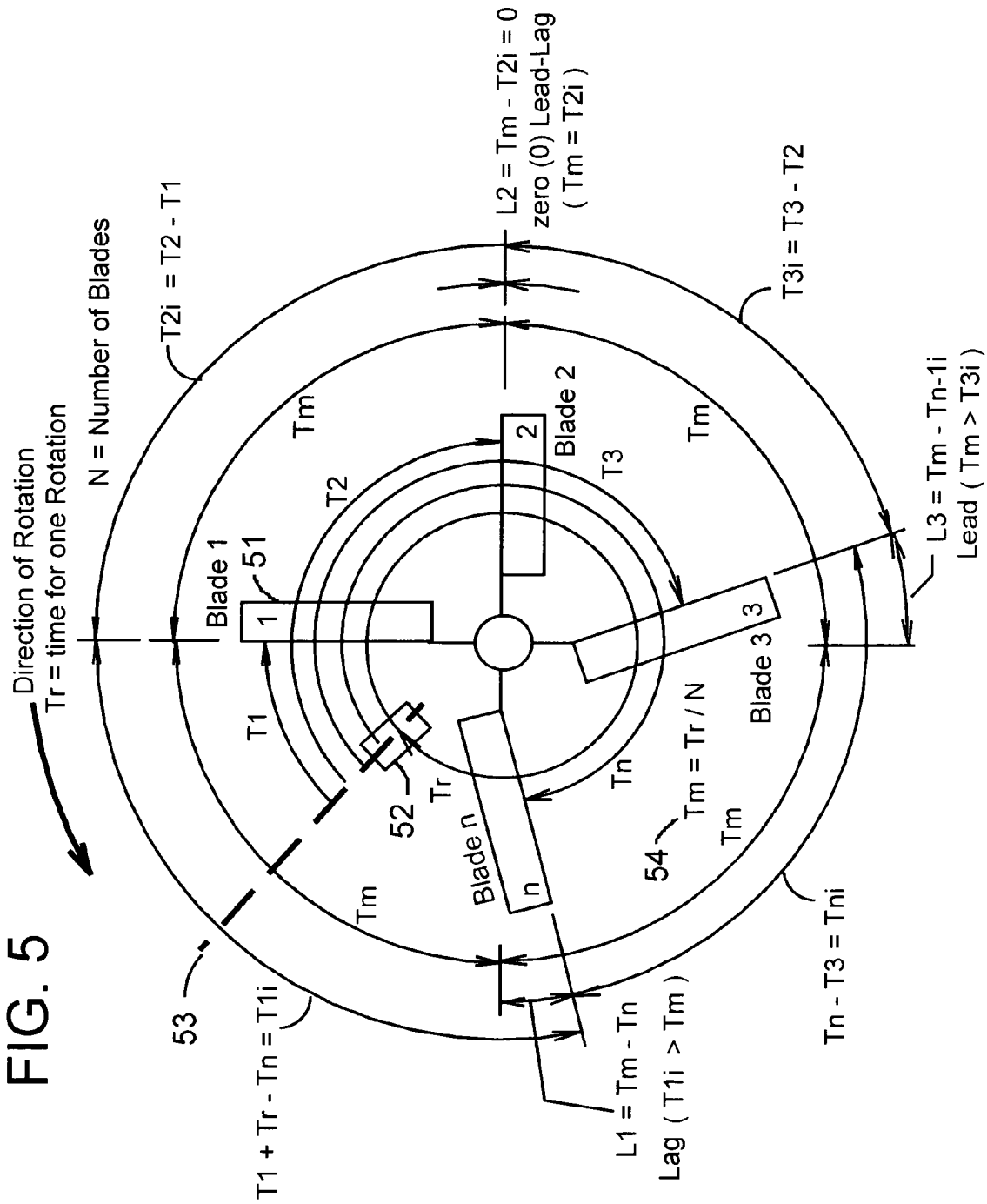

FIG. 5 describes one method of calculating lead/lag.

FIG. 6 is an example calculation including the sort step

FIG. 7A is an example of a stable centrifugal pitching moment.

FIG. 7B is an example of a blade with a tendency to climb.

REFERENCE NUMERALS 11 midpoint of a data set
12 upper linear value of a data set
13 lower linear value of a data set
41 rotor blades
42 tracking baseline
43 example of individual blade track height
44 formula, average track height
45 formula, blade height referenced to average track height
46 formula example, height of blade number three
51 rotor blades
52 tracker view and MPU location
53 extensions of tracker view and MPU revolution start position
54 formula, optimum blade spacing, time
61 Baseline Tracker Data block with data for three blades
62 Increased Track Resolution data block with data for three blades
63 Individual Blade Sort data block with three blades
71 mid-point of data set
72 data set plot, ground track
763 data set plot, hover track
100 start, track data input
101 process track data
102 store processed data
103 sort data sets
104 store sorted data sets
105 select data to be displayed
106 baseline sorted data
107 merge selected data sets
108 display selected data
109, decision fault yes or no
110 aircraft O.K.
111 fault analysis
112 aircraft repair action
113 retest aircraft

FIELD OF THE INVENTION

The present invention is directed to helicopter, tilt rotor aircraft, and whirl tower rotor blade tracking methods, in general, but more particularly to a method of using a computer to process Tracker data for the purpose of determining the mechanical and dynamic health of the rotor system and its attached blades.

DETAILED DESCRIPTION

FIGS. 1A, 1B, 1C; 1D, 1E, 1F, 2, 3, 4, 5 and 6—Preferred Embodiment

A commercially available optical or electronic device designed for tracking helicopter blades, Tracker, is used to generate helicopter rotor blade tracking data for each revolution of the rotor. The Tracker may be any of those taught in U.S. Pat. No. RE33,097 (original U.S. Pat. No. 4,604,526); U.S. Pat. No. 4,887,087; U.S. Pat. No. 5,929,431; U.S. Pat. No. 5,249,470; U.S. Pat. No. 6,448,942 and commercial derivatives of these patents. The data generated by the Tracker is blade height and blade time for each rotor blade on the rotor plus the total the time required for the rotor to make one revolution for each revolution during a tracking event. Blade height is described in FIG. 4. Blade time and total time are described in FIG. 5. An independent device, referred in the art as a "magnetic pickup", "MPU", "optical pickup", "OPU", or other descriptive name here after referred as "MPU", creates a signal at the start of each revolution of the rotor thus marking the start and end of each revolution of the rotor. This device is monitored by the optical tracking device or its control or computational device. A plurality of revolutions are taken by the Tracker and the data are passed to a computational device or the data are stored in a memory within the computational device or to portable memory media for processing at a later time or with a different computational device. The computational device and or memory may be part of the Tracker or external to the Tracker.

Operation

FIGS. 1A, 1B, 1C; 1D, 1E, 1F, 2, 3, 4, 5, 6

The essence of this invention is shown in FIGS. 1A, 1B, 1C; 1D, 1E, 1F where seemingly random or chaotic data are processed using the method to reveal rotor system health. FIG. 1A is a graphic plot of 100 revolutions of raw track data for one rotor blade. The graphical plot shows the blade moving in space in what appears to be a random and chaotic way. Aircraft manufacturers design blades, rotors, and control mechanisms in such a way as to ensure that the lift produced by the blades is predictable and within an acceptable range. The individual blade is designed to be mechanically captured in a restricted envelope of movement. A gust of wind, rapid blade loading changes, pilot control input, etc. can move the blades outside of this envelope briefly but the rotor mechanism physical and damping characteristics bring the system quickly back to the design operating envelope. The overall effect is that the blade moves about a point in space appear randomly. Mechanical wear, poorly adjusted blades, and a variety of other faults can expand the operating envelope and allow one or more of a plurality of blades on the rotor to display abnormal operating patterns.

FIG. 1B shows the blade in FIG. 1A after the data are processed as described by FIG. 2 and FIG. 3, to an Average Track values as detailed in FIG. 4. Note that the data in FIG. 1A ranges between 102 and 136 units and after processing the data range is between −3.8 and 1.3 units, as shown in FIG. 1B. This process is necessary to reduce the effects of Tracker motion during data collection and increases the resolution of the height and timing data. FIG. 1B data represents blade motion tendencies more precisely.

The next step is unique in its approach. The individual blade data set, as described by FIG. 1B, is sorted. The sort references only the individual blade time or height values of the individual tight condition. No information outside of that individual blade information is referenced in the sort. Sorting is done from maximum positive value to the minimum negative value. FIG. 1C is the sort of data in FIG. 1B. Sorting in the reverse order is also acceptable. Sorting the data without reference to any other values is not a logical processing step. Sorting of the data removes the actual time sequence of the data and rearranges it in the order of displacement from the mean value. The sorted data reduces the chaotic nature of the data set, reveals the operating envelop of the blade, places exceptional movements to the extremes of the sorted data set, and presents a linear quality to the greater portion of the data. The median track position, 11, is at 50 revolutions in FIG. 1C. The typical motion of the blade about the median track, 11, can be inferred to be the values marked by FIG. 1C reference numbers 12 and 13, the upper and lower values of the linear section of the data set.

FIG. 1D is a graphic plot of a set via plurality of blades on the same rotor as in FIG. 1A through FIG. 1C, and includes that single blade. The data illustrated in FIG. 1A and FIG. 1B appeared somewhat chaotic. The chaos of a plurality of blades is accentuated as shown in FIG. 1D. The data were all collected simultaneously from the same rotor by the Tracker.

FIG. 1E shows the effect of each blade data sets being processed as described above and illustrated in FIG. 1C. The result of using the method on the composite data set is coherence of the rotor data at the tested condition. Blade relationships and track variations, or splits, can be clearly seen. The blades flying in harmony have parallel or nearly parallel slopes. A blade system with little or no mechanical wear will show plots that are very close to horizontal when blade loads are very low. A few small adjustments to this blade set would bring the track together and a very well tuned blade set would be the result. A view of this rotor's blade timing data is shown in FIG. 1F.

A Rotor fault can be seen in FIG. 1F. The timing data, or Lead/Lag data, for the subject blades shown in FIG. 1D and were processed in accordance with FIG. 2 and FIG. 3 using the procedure described by FIG. 5 to refine the timing data. The timing data are also sorted as described above. Blade 1 indicates a faulty elastomeric damper. The dampers on blades 2, 3, and 4 are working together while the damper on blade 1 is typically 7 units high during most of its operating time indicating a probable fault. Discovery of a specific elastomeric damper fault is very difficult to locate without removal of a part and said part being subject to special testing off aircraft.

FIG. 2 is one of a plurality of methods used to process the data collected from the Tracker. The computational device may be imbedded in the Tracker, be a controlling or computational device for the tracker, or an independent computational device. The tracking data 100 are passed to the computational device electronically, electrically, or via memory device. The computational device will host a program or program module that generally will have the programming steps 101 through 108. Step 108, Display, can be any method, graphic, numeric, or text, of providing rotor related information to user of the computational device. Program steps 109 through 111 may be included in said program, be separate modules, or be part of other computational devices. Program step 109, 110, and 111 may also be accomplished via manual or electronic means specified by the manufacturer, aircraft owner, or other controlling party or agency. Steps 112 and 113 are indicative of the overall process and totally controlled outside of the preview of the program. These steps indicate the value of a quality assurance closed loop process where faults that are detected can be reassessed using the method indicated to confirm findings and improve fault detection. It is also possible that steps 109 through 113 collectively are outside of the program.

FIG. 3 is a flow chart that provides one method of processing the track data. The data input methods and computational devices are discussed above. The track data are processed in a plurality of data sets, such as those shown in blocks 101A and 101B. Track height data processed into plurality of data set as illustrated by blocks 101C, average track, and 101D, Track Step. A method of calculating average track and track step are further described in FIG. 4. Track Timing data are processed in a plurality of data sets as illustrated by blocks 101E, Absolute Lead/Lag, and 101F, Timing Step. A method of calculating Absolute Lead/Lag and Timing Step are further described in FIG. 5.

FIG. 4 is one method of calculating Average Track from the data provided by the Tracker. The calculation of average track height serves two purposes. The first purpose is to improve resolution of the blade movement. The second purpose is to reduce errors in track height induced by Tracker motion. Normally the field of view of the tracker can be very large relative to the variation in track from one blade to the next on the rotor. Variations in the track height from blade to blade are typically a few inches, small fractions of inches, down to no variation. One solution is to calculate Average Track for each revolution of the rotor. In this calculation a plurality of blades 41 are measured as they individually pass the Tracker during each revolution of the rotor. Track height 43 is measured as a value above some inferred baseline 42. The track height at the baseline is zero units. The Average Track Height is determined using the formula at reference 44. The measured track heights of all blades on the rotor, or the N blades, are summed. The N blade height sum is divided by N giving Average Track. FIG. 4, in formula 45 individual resolved blade track heights are calculated by subtracting the Average Track height value from the track height measured by the Tracker. An example of this is formula 46, the resolved height of blade number three. This process is accomplished for each individual blade and for each individual revolution of the rotor. It should be noted that average blade track during a given revolution of the rotor does not describe the total movement of the blade from that revolution to the next revolution.

Track Step is a vertical measurement value that describes the movement of the rotor blade from revolution 1 to revolution 2, 2 to 3, and etc. Raw track height from the prior revolution is simply subtracted from the track height from the current revolution. Track Step provides a view of the stability of the collective control of the rotor.

FIG. 5 is one method of calculating Lead/Lag using timing data provided by the Tracker. The figure represents a view of a rotor system, with a plurality of blades 51, from above. A Tracker and MPU, 52, are located at the same radial position referenced to the rotor. Said MPU, generates a signal at the start of the current revolution. The time required for Blade 1 to pass in front of the Tracker, 52 is T1. Blade 2 is recorded at time T2, Blade 3 at time T3, and so on through the plurality of blades. At the end of the rotation the MPU will signal the start of the next revolution and time $T_r$ is recorded as the total time required for that revolution of the rotor. Times $T_1$ through $T_n$ plus the total revolution time $T_r$ are typically recorded by the trackers. Blades are equally spaced around the rotor and the spacing between blades is FIG. 5, reference number 53, the total revolution time $T_r$ divided by the number of blades, N. Absolute Lead/Lag as defined here is the difference between the actual time between two blades and the average time, $T_m$. With this method a positive value for Lead/Lag is a leading blade, less than the time $T_m$. A negative value will indicates a lagging blade, more time than $T_m$. A time equal to $T_m$ is neutral, neither leading or lagging.

Time Step, FIG. 3, 101F is calculated by to subtracting the individual blade times, and total revolution time of the previous revolution, from that of the current revolution. Individual blade times are defined as in FIG. 5 as $T_{n,i}$ where "n" is blade number and total revolution time as $T_r$. The speed of the rotor is constantly changing as the loadings on the rotor change from moment to moment. The rotor's mechanical ability to compensate for the changes in loading changes is reflected in timing variations captured by the Tracker.

Once the plurality of calculations is accomplished, some indicated as 101C, 101D, 101E, and 101F, the data are stored 102. In another, program it could be more desirable to process the raw data each time there is need for specific information rather than storing the processed data.

Step 103, sort, decomposes the data set from a time related data set to a value related data set. The values can be sorted from maximum values to minimum value or minimum values to maximum values. Said decomposition places extraordinarily high or low data values at the upper or lower extremes of the data set. FIG. 6 is an example of the calculation including the sort step using small amount of data, 17 rotor revolutions. The Baseline Tracker Data, 61 shows track height data for 3 individual blades. The headings h1 through h3 are referenced to the raw blades heights in FIG. 4. The data are processed to increase the resolution of the data as described above and in FIG. 4. The result of said calculations are shown in 62, the data block marked Increased Track Resolution. Sorting of the individual blade data sets are shown in block 63, Individual Blade Sort. The data contained in data blocks 61 and 62 are time sequenced, first to last revolution as collected by the Tracker. The sorted data are value sequenced, highest to lowest. Data blocks 62 and 63 contain the same data but the order of the data in block 63 is decomposed to reveal a level of coherence.

FIG. 1C is an example of a sorted data set of 100 rotor revolutions for a single blade. This is an illustration of the value of the decomposition. The sort for this example is from maximum value to minimum value. The midpoint of the data set 11 is an accurate track for the blade. The linear portion of the data generally lies between values located at 12 and 13. The higher values are between 11 and 12 and lower values between 11 and 13. The range of motion of the blade is characterized by the slope of the line between 12 and 13. As blade's motion decreases the slope of the blade will be closer to horizontal as its motion increases the slop of the line will be steeper. Malfunctions, wear, mal-adjustments, and other factors force the blades to move in ways inconsistent with other blades on the rotor. One example can be seen in FIG. 1F.

The sorted data sets can be stored, FIG. 2 and FIG. 3, 104, in any of a variety of ways common to computers. In another form of the method of processing the original data FIG. 2, 100 and FIG. 3, 100 or FIG. 2, 102 and FIG. 3, 102 can be stored and the sorted data can be recreated each time the data are to be evaluated.

Data are selected to be displayed, FIG. 2 105. An appropriate method is used to select the data to be displayed. Data from the said sorted data 104 can be selected and sent to be displayed. Displays can be similar to the graphs shown in FIG. 1C, FIG. 1E, and FIG. 1F, but other display options, numeric, text or variations of graphic displays, can also be used. Baseline sorted data 105 may or may not be available or used. Baseline data are normally a set of data that represents a certain condition, either one with no faults or a form where faults are present. These data sets can be used to evaluate data being processed. Baseline data can be used for quality assurance purposes and reference by those viewing the data. When baseline data is used with the method it is appropriate to merge data 107 for purposes of display 108. Where baseline data are not available, or not used, prior processed data known to exhibit specific faults or fault free characteristics can be used to evaluate current data of similar or same rotor models.

FIGS. 7A, 7B

Additional Embodiments

Additional embodiments can spring from the combining of data from more than a single flight condition. One potent example is the merging of data from two flight conditions from the same flight used to determine chord-wise balance faults. Two flight conditions are used; Hover and Flat Pitch on the Ground. This can be done for one or a plurality of blades on the rotor at the same time. For the blades to being assessed it is preferred that the tab setting for said blades should be in at a known neutral setting. The neutral tab condition can be measured as normally accomplished in the art for the given aircraft and the tab position compared to factory settings established through testing or known neutral setting as established by proper authority. Further, total track variation during Plat Pitch on the Ground flight condition should not exceed one inch (approximately 25 millimeters) from highest to the lowest blade in the plurality of blades on the rotor. Gross out of track blades are typically flying at different pitch settings. Blades are tracked at said flight conditions and the data processed as indicated in above. Data from the Hover and Flat Pitch on the Ground are merged for each blade for evaluation. A graphic example of the process is shown in FIGS. 7A, 7B. In FIG. 7A the midpoint of the graphic 71 is crossed by the Blade 1 Ground Track 72 and Hover Track 73. The Hover track 73 shows a steeper slope than the Ground Track 72 because of the relative power differences and rotor loading at the two conditions. The zero crossing at or near 71 indicates the blade is a very stable in the chord-wise axis. FIG. 7B is an example of a blade with a tendency to climb. The midline of the data set 71 gives is crossed by the Hover track 73 approximately 3.5 units above the Ground track 72 indicating the blade is pitching upward when loaded.

Alternative Embodiments

FIG. 2

There are various possibilities in combining track data processed in accordance with the invention with accelerometer data. As has been noted, Trackers and accelerometers are in current use on vertical lift aircraft. FIG. 2, 111 indicates a method of using and combining data from different sources including accelerometers to analyze detected faults. Data integration often improves certainty of fault type and location based on historic data. Further, structural faults can impact rotor stability wherein the data obtained from the accelerometers can be essential into the analysis of the fault. To be able to combine these data together it is important that track and acceleration data be taken simultaneously. The accelerometer data typically will be taken by a piece of equipment specifically designed to collect acceleration data. It is important that the same number of revolutions is taken by the accelerometers as the number of track revolutions. Revolution counting should be made by the same MPU as that used to collect track data. The accelerometer data may be collected and processed independently or by any available processor normally used for gathering data from said aircraft. The accelerometer data may be collected and processed by the same processor used by the Tracker. The accelerometers used to collect this data should have a frequency range from 2 Hz to at least two times the blade pass frequency of the rotor. A variety of methods of processing the acceleration data may be used including techniques as taught by U.S. Pat. No. 4,937,758 and U.S. Pat. No. 6,415,206B1. It is desirable for raw data collected from said accelerometers, stored in a way to allow the data to be otherwise processed. The data may be processed in a way similar to the methods of described in this invention, especially the sorting of said processed raw acceleration data. The data so processed can be used in combination with track data to improve the ability to highlight and discover rotor faults, mal-adjustment of rotor blades, or improvements of operating setting to further reduce aircraft vibrations and improve vehicle safety.

CONCLUSION, RAMIFICATIONS, AND SCOPE

Accordingly, the reader will see that the method of using of Tracker revolution to revolution data in the various embodiments can identify vertical flight aircraft and rotor tower rotor system faults and dynamic system instability. Furthermore, said method has the additional advantages that It provides one of the only methods to directly monitor vertical lift aircraft rotor system for faults, failures and stability available to the aircraft operator; requiring no physical changes to aircraft, rotor, or blades:

it allows for rapid safety and maintenance assessment of aircraft rotor system prior to and/or during a prolonged flight;

it is easily implemented or using current technology and can be integrated into a variety of aircraft health and usage monitoring systems available in the art;

it provides a way of determining centrifugal pitch moment stability of any blade and thereby, the possibility of modifying said pitching moment in the field;

it provides a way of conducting aircraft rotor track and balance (RTB) using only two flight conditions instead of a plurality of condition where said RTB can be conducted completely within the boundaries of the flying field or landing platform for the aircraft, thereby significantly reducing RTB time and cost, and increasing safety;

it provides a for the rapid analysis, evaluation, and maintenance tool for reduction of rotor system and blade related problem for high tempo of operations in fielded aircraft; and if provides for very high return of investment on assets expended to utilize the subject invention.

Although the description of the above contains much specificity, these should not be construed as limiting the scope of the embodiment but merely as providing illustrations of some of the presently preferred embodiments. For example other embodiments may utilize a variety of non-traditional sensors to enhance the ability to focus on specific types of fault and failure mechanisms.

The invention claimed is:

1. A method of processing blade tracking height and timing (lead-lag) data for a plurality of 50 or more revolutions of a rotor with a plurality of blades to detect defects, if any, in at least one rotor with a plurality of blades of a rotary wing or tilt rotor aircraft, where a defect corresponds to a fault or failure, including maladjustments, of any part of the rotor with a plurality of blades, comprising:

a. tracking data are collected and stored in a computer for each revolution of a rotor with a plurality of blades, and for each of one or a plurality of steady state flight conditions of the aircraft under test, for determining average track height and absolute lead-lag values for each revolution of the rotor with a plurality of blades and segregating the values into data sets of track height and lead-lag;

b. using the computer to sort the stored track heights and lead-lag data sets; wherein i. each data set of a rotor with a plurality of blades is sorted so the values of the individual blade track height or lead-lag, are arranged from maximum value to minimum value, or in reverse order;

ii. the distribution of values of each individual blade track height or lead-lag places anomalous or major variations values at its extremes;

iii. the distribution of individual blade track height or lead-lag reveals the motion of the blades on a rotor with a plurality of blades and the motion is defined by the variation about median values;

c. the collected data and sorted data are stored separately so that the collected data are preserved and sorted data are used to analyze the condition of the rotor with a plurality of blades; wherein i. the slope of the distribution of track height data defines the relative power necessary to drive each individual blade and blade tendencies to climb or dive on a rotor with a plurality of blades;

ii. the distribution of the lead-lag data defines the effectiveness of the damping system and the drag and weight imbalance in the lateral plane of rotation of a rotor with a plurality of blades;

iii. the distribution of individual blade track heights or lead-lag of individual blades of a rotor with a plurality of blades are compared one to another in either track height or lead lag or in combination to determine the dynamic tendencies of the blades or rotor, rotor component interactions, rotor or blades anomalous behavior, and defects of the rotor with a plurality of blades;

d. the distribution data of track heights and lead-lag are displayed graphically for use in maintenance or the safe operation of the aircraft.

2. The method according to claim 1, wherein using graphic displays to detect defects in a rotor with a plurality of blades, wherein distribution data of track heights and lead-lag from one or more flight conditions of a rotor with a plurality of blades are compared one to another, in track height, lead-lag, or in combination, and are displayed graphically such that defects of a rotor with a plurality of blades are identified.

3. The method according to claim 1, wherein distribution data of track heights and lead-lag from two aircrafts of the same model are compared to detect known defects, and the distribution data of a rotor with a plurality of blades used are from one aircraft where known defects exist and are compared against the distribution data from another aircraft rotor with a plurality of blades to determine the existence of the same or similar defects in its rotor with a plurality of blades where distribution data from both aircrafts are at the same flight condition.

4. The method according to claim 1, wherein distribution data of track heights and lead-lag from two aircrafts of the same model are compared and the distribution data from an aircraft rotor with a plurality of blades where no defects exist are used to determine the absence or existence of defects in another aircraft rotor with a plurality of blades and the distribution data from both aircrafts are at the same flight condition.

5. The method according to claim 1, wherein the median points of the blade height and lead-lag distribution data accurately represent track height and/or lead-lag values of a rotor with a plurality of blades, wherein the ability to properly correct maladjustments on a rotor with a plurality of blades depends upon the accuracy of the track height and lead-lag values derived, and wherein average distribution data of track height and lead-lag values can be inaccurate as large variations in track height or lead-lag skew average track height and/or lead-lag value calculations by increasing or decreasing the averaged value, wherein, large variations in the distribution data of track height and lead-lag values are at the extremes of the distribution data thereby making the median values at or closer to the actual steady state dynamic track height or lead-lag value of any blade on a rotor with a plurality of blades and provide for accurate corrections to maladjustments.

6. The method according to claim 1, wherein the sorted data are further processed to extract further evidence of mechanical defects or dynamic instability of a rotor with a plurality of blades or its individual or collective parts by analyzing the magnitude or variations in the distribution data of track height and lead-lag values around the median value of the blade track height and/or lead-lag distribution data as the variations in values represents the blade motion vertically and laterally, and the changes in values define the rate of change of that motion, thereby revealing the tendencies of one or more parts of a rotor with a plurality of blades to operate within, reach, or exceed the limits of motion imposed by the part or attached parts.

7. A method according to claim 1, wherein the degree of stability of the cord-wise centrifugal pitching moments of a rotor with a plurality of blades is determined by data from one or more flight conditions of a rotor with a plurality of blades, wherein the track height and lead-lag distribution data are compared one flight condition to another to determine track height and lead lag variations, distribution data slope, median distribution data crossing points, and other indicators of blade centrifugal pitching moment stability of a rotor with a plurality of blades wherein a wide variation in stability of the collective blade pitching moments render a rotor with a plurality of blades unstable.

8. The method according to claim 1, wherein vertical lift aircraft track height and lead-lag data from a rotor with a plurality of blades are combined with accelerometer data from the same aircraft processed to extract frequencies and their amplitudes to enhance the detection of defects of the rotor with a plurality of blades comprising:
   a. collecting frequency data during the same period of time that the track height and lead-lag data are collected;
   b. the accelerometer data are processed independently to extract frequency and amplitude of the data; wherein
   c. the track height and lead-lag data and the accelerometer frequency data and amplitude data are analyzed together to highlight, enhance and improve the detection of defects or maladjustments of a rotor with a plurality of blades; and wherein
   d. defects such as rotor shaft bearing wear, excessive rotor gyration, and/or blade attachment defects are revealed when accelerometer first and second harmonic frequencies have high amplitudes in combination with track height and lead-lag data showing abnormal data variation about the mean data values of a rotor with a plurality of blades.

* * * * *